United States Patent [19]
Goldman

[11] 3,794,886
[45] Feb. 26, 1974

[54] FLUID COOLED SEMICONDUCTOR SOCKET

[76] Inventor: Wayne E. Goldman, 33 Turning Mill Rd., Lexington, Mass. 02173

[22] Filed: June 26, 1972

[21] Appl. No.: 266,326

Related U.S. Application Data

[63] Continuation of Ser. No. 104,702, Jan. 7, 1971, abandoned.

[52] U.S. Cl. ............................... 317/100, 174/15 R
[51] Int. Cl. ........................... H05k 7/20, H02b 1/04
[58] Field of Search ........... 174/15 R, 16 R, DIG. 5; 317/100, 234 A

[56] References Cited

UNITED STATES PATENTS

| | | | |
|---|---|---|---|
| 3,400,543 | 9/1968 | Ross | 174/15 R |
| 3,405,323 | 10/1968 | Surty | 317/100 |
| 2,984,274 | 5/1961 | Race | 174/DIG. 5 |
| 3,292,050 | 12/1966 | Grossoehme | 317/100 |
| 3,143,592 | 8/1964 | August | 317/100 |

FOREIGN PATENTS OR APPLICATIONS

| | | | |
|---|---|---|---|
| 1,018,623 | 1/1966 | Great Britain | 317/100 |

*Primary Examiner*—Herman J. Hohauser
*Assistant Examiner*—Gerald P. Tolin
*Attorney, Agent, or Firm*—Chittick, Thompson & Pfund

[57] ABSTRACT

A fluid cooled semiconductor socket comprising a thermally conductive plate adapted to hold the semiconductor in good thermal contact with the plate at a point of the semiconductor case having a hgh thermal conductivity with the semiconductor chip inside the case. A thermally conductive fluid conduit is attached to the plate on a face directly opposite from the semiconductor. The conduit is placed so as to maximize the thermal conductivity between the point where it is placed on the plate and the semiconductor chip, but still allow the electrical leads from the semiconductor to pass through the plate and establish electrical contact on the other side without obstruction by the fluid conduit. The fluid flowing through the conduit is made to absorb and conduct away increased amounts of heat by narrowing the conduit where it is in contact with the plate so as to increase the fluid velocity and reduce the slow moving fluid boundary layer in contact with an inner wall of the conduit, and by promoting turbulence in the field flow through ths narrowed portion. The plate and conduit are imbedded in a plastic housing which is keyed to lock into a multi-socket strip which orientates the conduit ends for mating with electrical leads and with manifolds conveying the cooling fluid.

10 Claims, 5 Drawing Figures

INVENTOR
WAYNE E. GOLDMAN

BY
Chittick, Pfund, Birch, Samuels & Gauthier
ATTORNEYS

INVENTOR
WAYNE E. GOLDMAN

BY

ATTORNEYS

FLUID COOLED SEMICONDUCTOR SOCKET

This is a continuation of application Ser. No. 104,702 filed Jan. 7, 1971, now abandoned.

BACKGROUND OF THE INVENTION

The advance of semiconductor devices has allowed ultra miniaturization of active electronic components including those designed to control large amounts of electrical current and power. The theoretical efficiency of these elements is the same as that of their larger thermionic parents so that a significant portion of the power controlled by these semiconductors will be converted to heat. The smaller surface area of these ultra small semiconductor devices means that unless new methods are found to drain off this heat, extremely high temperatures and temperature fluctuations will be experienced and cause component failures or loss of performance.

There are available today many finned structures attachable to semiconductor devices which increase the flow of heat from the semiconductor to convection currents in the surrounding atmosphere. Improved semiconductor fabrication techniques have continuously raised the power level which a single semiconductor device is able to control. This in turn has resulted in the insufficiency of convection or even forced air techniques in cooling semiconductors which control high power levels.

Special fluids or liquids such as water are inherently better for conducting heat away from semiconductor devices because of their higher specific heat or ability to absorb heat. Some attempts to use a liquid medium for cooling high powered semiconductor devices have resulted in bulky, expensive, and awkward cooling systems due to the competing need for proximity to the semiconductor device of both thermal and electrical contacts.

It is thus a general object of the present invention to provide a fluid cooled semiconductor socket having the fluid coolant in good thermal contact with the heat generating semiconductor chip without interferring with the necessary electrical connections to the semiconductor.

It is a more specific further object of this invention to provide a conduit design for a fluid cooled semiconductor socket which enhances the conduction of heat from the conduit to the fluid coolant.

It is a further specific object of this invention to provide a fluid cooled semiconductor socket which allows use of a plurality of sockets facilitating connection with a coolant circulating system and electrical supply means whereby any desired number of transistors may be cooled from the same coolant system.

It is a further general object of this invention to provide a fluid cooled semiconductor socket which is simple and easy to manufacture.

SUMMARY OF THE INVENTION

In the preferred embodiment of this invention a liquid cooled semiconductor socket is shown comprising a plate of thermally conductive material having means for securing to a face of the plate a semiconductor device so as to provide good thermal conductivity between the plate and the case of the semiconductor device at a point on the case which is in good thermal contact with the semiconductor chip within. On the face of the plate opposite from the semiconductor device a fluid conduit is attached to the plate over an area directly opposite from the point of contact between the plate and the semiconductor case. Electrical leads from the semiconductor device pass through the plate and protrude beyond the opposite face.

In most semiconductor devices the electrical leads pass through the case at a point to one side of the spot where the semiconductor chip within is heat sunk to the case. This allows the area of contact of the fluid conduit to be placed directly below and in maximum thermal contact with the semiconductor chip without interferring with the electrical leads. The area of contact between the conduit and plate can be extended for a distance either side of the point closest to the semiconductor chip to increase the thermal conductivity between the conduit and the plate.

The thermally conductive plate is imbedded in a housing which may be plastic and has the face of the plate holding the semiconductor device flush with a surface of the housing. Intake and outlet portions of the conduit extend beyond the housing while electrical connectors contact the electrical leads within the housing and extend to terminals outside the housing.

The housing is slotted so as to fit into corresponding rails on a strip for holding the multiplicity of sockets in a prescribed orientation whereby the intake and outlet portions of the conduit may be easily mated with supply and exhaust manifolds in a fluid coolant system and whereby the terminals on the electrical connectors can make contact with connectors to other circuitry.

Where the conduit contacts the plate it is narrowed so as to increase the velocity of the fluid flow in that section of the conduit. This higher velocity reduces the effect of the slower moving boundary layer of fluid which contacts the inner wall of the conduit and impedes the transfer of heat from the conduit walls to the fluid. A suitable turbulence generating means can be placed inside the conduit upstream from the narrowed portion to increase the turbulence of the fluid as it flows through the narrowed portion thereby further reducing the effect of the boundary layer. Radiators can also be provided projecting from the inner wall of the conduit into the narrowed portion to increase the contact area between the fluid and conduit walls at this point of heat transfer.

A thermostatic device can be placed in the conduit or manifolds downstream from the narrowed portion to control the rate of fluid flow in response to the temperature of the exiting fluid to provide temperature regulation of the semiconductor device.

The objects and features of the present invention will best be understood from an attached description of a preferred embodiment of this invention selected for purposes of illustration and shown in the accompanying drawings in which.

DETAILED DESCRIPTION OF THE PREFERRED EMBODIMENT

Figure 1:
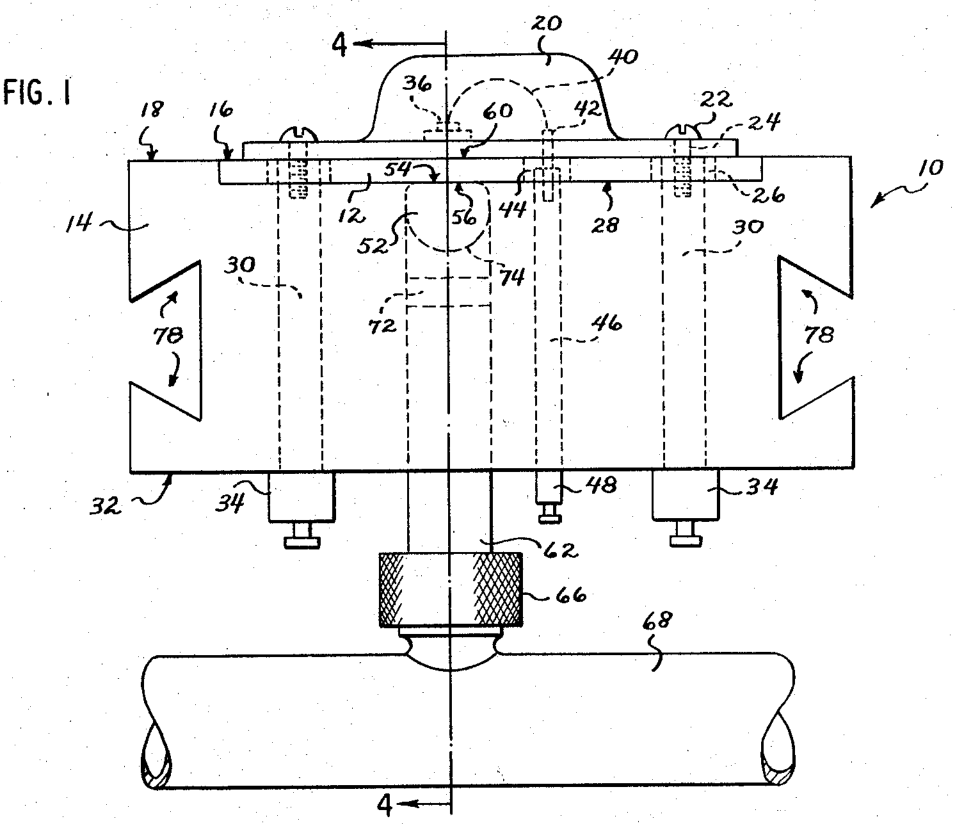
FIG. 1 is an elevation view of a liquid cooled semiconductor socket showing the housing plate and semiconductor device in assembled form and illustrating the internal placement of the conduit and the electrical connectors.

Referring to FIG. 1 there is shown an assembled socket indicated generally by the reference numeral 10 with the internal details depicted by dotted lines. A thermally conductive plate 12 is embedded in a housing 14 with the plate surface 16 flush with the top surface 18 of the housing. A semiconductor device 20 is held in thermal contact with the plate surface 16 by a plurality of machine screws 22 which extend through corresponding holes 24 and 26 in the semiconductor device 20 and in the plate 12, respectively. The plate holes 26 extend from the surface 16 to an opposite surface 28 inside the housing 14. Electrically conductive electrical connectors 30 are threaded to mate with the screws 22 and, without touching plate 12, continue through the housing 14 to a bottom surface 32 of the housing 14 opposite the top surface 18. The electrical connectors 30 exit from the housing 14 through the bottom surface 32 where they end as electrical terminals 34.

A semiconductor chip 36 is shown inside the semiconductor device 20 and in good thermally conductive contact with a portion of the semiconductor case 38 which contacts the surface 16 of the plate 12. The case 38 is illustratively shown as a TO–3 case. Conducting wires 40 connect appropriate points of the chip 36 to electrical leads 42. The electrical leads 42 are electrically conductive pins insulatingly secured to the semiconductor case 38 and passing therethrough in the direction of the housing 14. The electrical leads 42 eminate from the semiconductor device 20, and pass through holes 44 in plate 12 from the upper surface 16 to the lower surface 28 of the plate (as viewed in FIG. 1) and then extend down into the housing 14. An electrically conductive electrical connector 46 receives the electrical lead 42 in electrical contact within the housing 14 and extends therethrough exiting from the housing 14 through the bottom surface 32 to an electrical terminal 48. For purposes of clarity, only one connector 46, terminal 48, and hole 44 are shown in FIG. 1 with only one wire 40 depicted within the semiconductor device 20 and only one lead 42 shown eminating therefrom. More may be provided in the same manner.

A cylindrical thermally conductive conduit 50 has a narrowed portion 52 with an outer surface 54 flattened over a length of the narrowed portion 52. The flattening of the conduit 54 can contribute to its narrowing if desired. The flattened portion 54 is attached in good thermal contact to the plate 12 on surface 28 at a point directly below the semiconductor chip 36.

Figure 3:
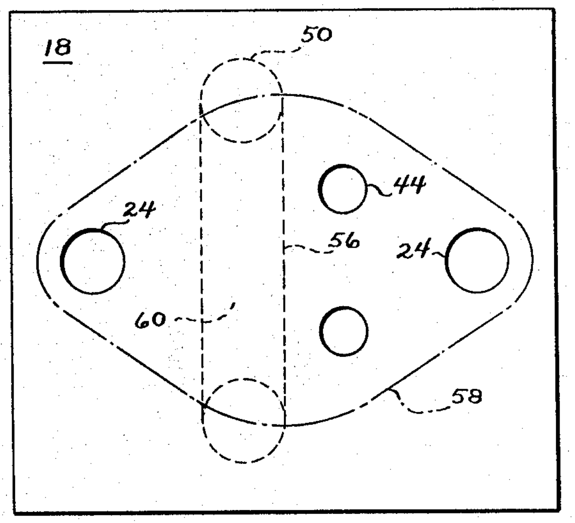
FIG. 3 is a view looking down on the plate inbedded in the housing and having an outline of the semiconductor device case thereon.
Figure 2:
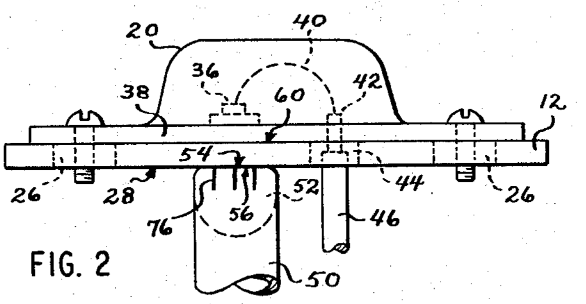
FIG. 2 is a side elevation of the plate and conduit attached thereto without the housing.
Figure 4:
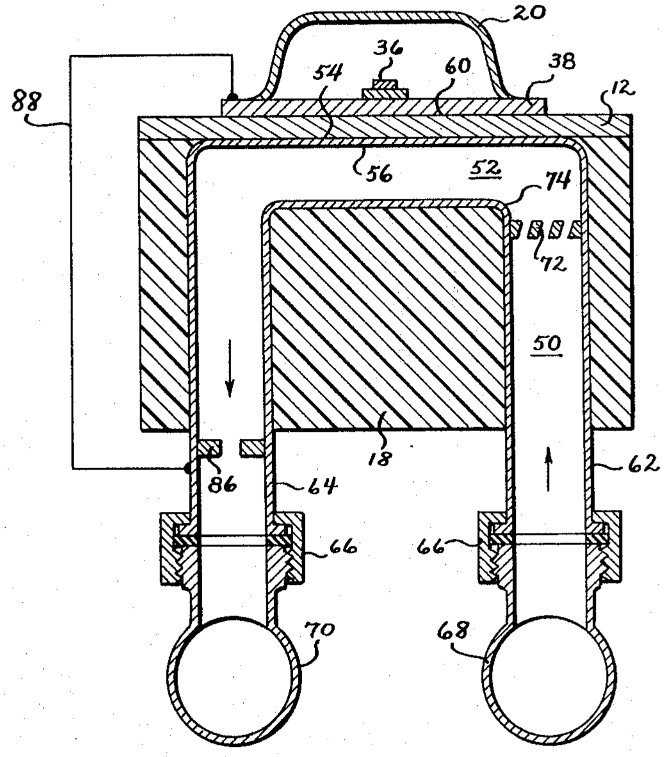
FIG. 4 is a sectional view of the semiconductor device and semiconductor socket taken along the lines 44 in FIG. 1; and, FIG. 5 is a side elevation of a series of sockets locked into a socket strip with a manifold attached to the conduits.

The shape and position of the conduit 50 can be better understood by referring to FIGS. 2,3, and 4. In FIG. 2, the conduit 50 is shown with the flattened length 54 of the narrowed portion 52 fastened to a spot 56 on the surface 28 of the plate 12 in a side elevation.

In FIG. 3, a view looking down on the surface 18 of the plate 12, an outline 58 is shown for the semiconductor case 38 where it contacts the plate 12. A heat flux area 60 on plate 12 is located directly above the conduit spot 56 and included within it. The heat flux area 60 represents the area of contact between plate 12 and the semiconductor case 38 directly below the semiconductor chip 36 and through which the heat flux from the semiconductor chip 36 to the conduit 50 will be most concentrated.

In the sectional side view of FIG. 4, the narrowed portion 52 of the conduit 50 is shown extending beneath the plate 12 for nearly its full width with the flattened length 54 and spot 56 making good thermally conductive contact with plate 12 over this entire width.

The conduit 50 has intake and outlet portions 62 and 64, respectively, which are coupled through mating means 66 to supply and exhaust manifolds 68 and 70. If the conduit 50 and plate 12 are electrically conductive, the mating means 66 is formed of a non-electrically conductive material to prevent electrical contact from being made between the cases of several semiconductor devices through the manifolds 68 and 70 since the chip 36 in this and other case configurations has an electrical contact to the case 38.

Referring to FIG. 4, a turbulance creating device 72 is shown in the conduit 50 between inner walls thereof and upstream from the narrowed portion 52 to increase turbulance in the fluid flow in the narrowed portion 52. A bend 74 at the junction of the narrowed portion 52 and the upstream part of the conduit 50 also operates to increase turbulance in the fluid flowing through the narrowed portion 52. The narrowed portion 52 also has a cross-sectional fluid flow area which is significantly smaller than that of the rest of the conduit 50 thereby increasing the velocity of the fluid flowing through the narrowed portion 52. The increase in fluid velocity and turbulance minimizes the boundary layer effect which results from a layer of the fluid in contact with the walls of the conduit 50 in the narrowed portion 52 moving at a slower velocity than the rest of the fluid. The boundary layer effect should be minimized in order to achieve maximum heat transfer from the conduit 50 to the stream of flowing fluid.

Looking back for a moment to FIG. 2, a plurality of fins or radiators 76 can be placed in conduit 50 extending outwardly from the inner wall thereof along the flattened length portion 54. The radiators 76 increase the area of the inner wall of the conduit in the narrowed portion 52 and provide a concommitant increase in the heat transfer from the conduit to the flowing fluid.

Figure 5:
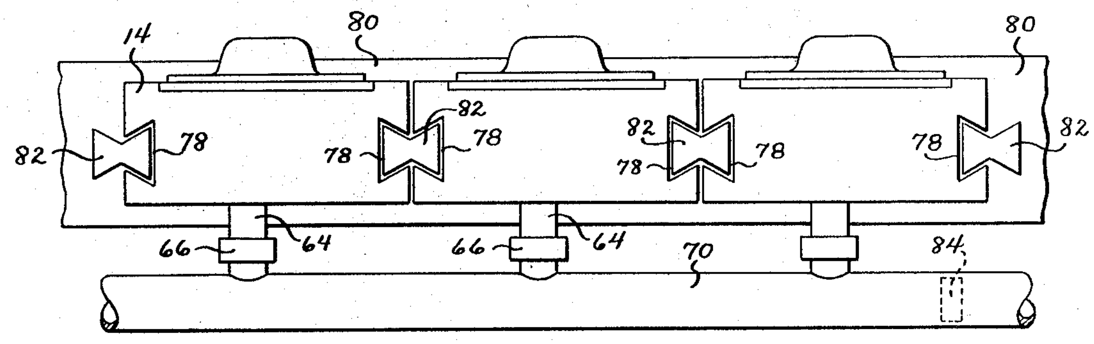

Referring to FIG. 5, a plurality of grooves or slots 78 are formed in each end of housing 14. The grooves or slots 78 allow several housing 14 to be placed end-to-end on a socket strip 80 and locked in a precise orientation by means of corresponding outwardly extending rails 82 which mate with the slots 78. This preselected orientation for housings 14 allows the intake and outlet portions of the conduit to be accurately positioned for proper mating with the manifolds 68 and 70. In FIG. 5 the conduit outlet portion 64 is shown mating through connecting means 66 to exhaust manifold 70 while the intake portion 62 in the supply manifold 68 is concealed from view.

A thermostatic means 84 is positioned in the exhaust manifold 70 to allow regulation of the temperature of the fluid flowing through the exhaust manifold and consequently a regulation of the temperature of the semiconductor devices 20. Alternatively, as shown in FIG. 4, a flow rate regulating means 86 may be placed in the conduit 50 downstream from the narrowed portion 52 to control the rate of flow of fluid through the conduit 50 in response to a temperature signal carried over a connector 88 from the semiconductor device 20. This latter arrangement allows a more direct regulation of the temperature of the semiconductor device 20 by varying the flow rate.

It will be appreciated that the present invention is not limited to the specific forms of socket or semiconductor case 38 pictured and described above and that other housing and case constructions can be employed.

Having described in detail a preferred embodiment of my invention, what I desire to claim and secure by Letters Patent of the United States is:

1. A fluid cooled semiconductor assembly comprising:

a. a semiconductor device comprising a case having a planar exterior portion, a semiconductor chip internally mounted within the case, said planar exterior portion of the case having an area directly beneath and in thermally conducting contact with the semiconductor chip which defines a heat flux area, and a plurality of semiconductor leads which extend through and outwardly from said case with at least one of said semiconductor leads being electrically insulated from the case;

b. an electrically insulative semiconductor socket housing;

c. a planar, thermally conductive, semiconductor device mounting plate positioned on said housing and having a plurality of semiconductor lead receiving apertures therein;

d. means for holding said housing, semiconductor device mounting plate and semiconductor device in assembled, superposed relation with the planar heat flux area of said semiconductor case in direct physical, thermally conducting contact with said planar semiconductor device mounting plate and with the semiconductor leads extending into said lead receiving apertures; and, e. a generally U-shaped thermally conductive fluid conduit confining a fluid flow and having a flatened outer part in direct physical, thermally conducting contact with the planar semiconductor mounting plate directly beneath said semiconductor case heat flux area whereby a fluid flowing through said conduit will absorb and conduct heat away from the semiconductor chip when the semiconductor device is held in said superposed relation with said thermally conductive semiconductor device mounting plate and is electrically activated.

2. The assembly of claim 1 characterized by said conduit having a narrowed portion of diminished cross-sectional flow area in the region of said conduit where it is in thermally conducting contact with said heat flux area whereby the velocity of fluid flowing through said narrowed portion is increased so as to reduce the boundary layer effect of the fluid layer in contact with the inner walls of said conduit.

3. The assembly of claim 1 characterized by said conduit having a flattened length including the outer part in thermal contact with said heat flux area whereby said conduit is narrowed and placed in increased thermal contact with said heat flux area.

4. The assembly of claim 1 wherein the plurality of electrical leads extending outwardly from said semiconductor case pass through the lead receiving apertures of said semiconductor mounting plate with only one of said leads in electrical contact with said plate.

5. The assembly of claim 1 wherein said conduit contains means up stream from the point of contact with said heat flux area for increasing turbulance in the fluid flowing through said conduit at said point of contact.

6. The assembly of claim 1 wherein means are provided in said conduit at the point of contact with said heat flux area for increasing the area of contact between the fluid in said conduit and an inner wall of said conduit.

7. The assembly of claim 1 wherein said conduit is positioned within said housing and has intake and outlet portions extending outwardly from said housing.

8. The assembly of claim 7 wherein said socket housing has means locking a plurality of said socket housings in a preset orientation to a socket strip.

9. The assembly of claim 8 further comprising means at preset locations on said socket housings mating respectively with said intake and outlet portions of said conduit to supply cooling fluid to said intake portion and remove cooling fluid from said outlet portion.

10. The assembly of claim 1 further comprising means for controlling the rate of said fluid flow in response to a signal.

* * * * *

UNITED STATES PATENT OFFICE
CERTIFICATE OF CORRECTION

Patent No. 3,794,886 Dated February 26, 1974

Inventor(s) Wayne Goldman

It is certified that error appears in the above-identified patent and that said Letters Patent are hereby corrected as shown below:

ABSTRACT [57] line 4, "hgh" should be-- high --.

ABSTRACT [57] line 20, "field" should be --fluid --.

ABSTRACT [57] line 20, "ths" should be --this--.

Column 6, line 2, "relation" should be --relations --.

Signed and sealed this 10th day of September 1974.

(SEAL)
Attest:

McCOY M. GIBSON, JR.
Attesting Officer

C. MARSHALL DANN
Commissioner of Patents